United States Patent
Raundahl Gregersen et al.

(10) Patent No.: US 9,639,329 B2
(45) Date of Patent: May 2, 2017

(54) SYSTEM AND METHOD FOR AUTOMATIC INVOCATION OF CONSTRUCTOR CODE FOR SUPERCLASSES

(71) Applicant: Syddansk Universitet, Odense M (DK)

(72) Inventors: Allan Raundahl Gregersen, Odense SO (DK); Michael Rasmussen, Odense M (DK); Bo Norregaard Jorgensen, Odense M (DK)

(73) Assignee: Syddansk Universitet, Odense (DK)

( * ) Notice: Subject to any disclaimer, the term of this patent is extended or adjusted under 35 U.S.C. 154(b) by 145 days.

(21) Appl. No.: 13/915,193

(22) Filed: Jun. 11, 2013

(65) Prior Publication Data

US 2013/0339926 A1    Dec. 19, 2013

Related U.S. Application Data

(60) Provisional application No. 61/660,002, filed on Jun. 15, 2012.

(51) Int. Cl.
*G06F 9/44* (2006.01)
*G06F 9/445* (2006.01)

(52) U.S. Cl.
CPC ............ *G06F 8/31* (2013.01); *G06F 8/67* (2013.01); *G06F 9/44521* (2013.01)

(58) Field of Classification Search
CPC ............ G06F 8/31; G06F 8/67; G06F 9/44521
USPC ................................................ 717/114–119
See application file for complete search history.

(56) References Cited

U.S. PATENT DOCUMENTS 8,707,278 B2 *  4/2014  Balakrishnan et al. ...... 717/136
2008/0282266 A1  11/2008  Kabanov

FOREIGN PATENT DOCUMENTS

WO   2011/072970   6/2011
WO   2012/065845   5/2012

OTHER PUBLICATIONS

The Java™ Tutorials, "Inheritance", Nov. 2011, in Lesson: Interfaces and Inheritance, retrieved from https://web.archive.org/web/20120117065253/http://docs.oracle.com/javase/tutorial/java/IandI/, 21 pages.*
Community.wvu.edu, "Chapter 11—Inheritance and Polymorphism", Apr. 2010, retrieved from, http://community.wvu.edu/~rel007/f10cs122/wk10/Chapter11.pdf, pp. 374-404.*
Kim et al., "Overcoming JVM HotSwap Constraints via Binary Rewriting", 2008, Virginia Tech, 5 pages.*

(Continued)

*Primary Examiner* — Ted T Vo
(74) *Attorney, Agent, or Firm* — HoustonHogle LLP

(57) ABSTRACT

A system and method for automatic invocation of object initializers, or constructors, for superclasses featuring the ability to modify the contents of classes of existing applications at runtime, which includes adding new superclasses to the class inheritance hierarchy of the existing classes. The system redefines the content of classes of the existing classes and the new superclasses during the loading of the classes to additionally include code statements that invoke constructors of the redefined classes and the new superclasses. The invocation of the constructors at runtime performs the initialization of the objects.

30 Claims, 10 Drawing Sheets

(56) References Cited

OTHER PUBLICATIONS

Kim et al., "Dynamic Software Updates for Accelerating Scientific Discovery", 2009, Springer-Verlag Berlin Heidelberg, pp. 237-247.*

Gregersen A. R. et al., "Javeleon: An Integrated Platform for Dynamic Software Updating and its Application in Self-systems," IEEE, 2012, 9 pages.

International Search Report mailed Sep. 24, 2013, from International Application No. PCT/IB2013/001228, filed on Jun. 12, 2013.

Dmitriev, M., "Safe Class and Data Evolution in Large and Long-Lived Java Applications," PhD thesis, University of Glasgow, 2001.

Gregersen A. R., "Extending NetBeans with Dynamic Update of Active Modules," PhD thesis, University of Southern Denmark, 2010.

Wurthinger T., "Dyanmic Code Evolution for Java," PhD thesis, Johannes Kepler University Linz, Apr. 2011.

Pukall M., "Javadaptor: Unrestricted Dynamic Updates of Java Applications," PhD thesis, University of Magdeburg, Germany, Mar. 2012.

International Preliminary Report on Patentability, mailed on May 12, 2016, from International Application No. PCT/IB2013/001228, filed on Jun. 12, 2013. Six pages.

* cited by examiner

```
// new superclass Bike
public class Bike {                              ← 510-3
    private int seatHeight;                      ← 504-3
    private int gear;
    private Map<String, String> attributes;      ← 506-4 public Bike(int seatHeight, int gear) {
        this.seatHeight = seatHeight;
        this.gear = gear;
        attributes = new HashMap<String, String>();
    } public void addAttribute(String entry, String value) {    ← 508
        attributes.put(entry, value);
    }
} // end Bike
```
(502, 184)

FIG. 6C

```
// example program execution after redefinition        ← 512-1
...
// get the first bike stored in shop
for(Bike bike : getAllBikes()) {
    // for existing mountain bike objects, gives      ← 514
    // null pointer exception since object was
    // created before it had Bike super class
    // so attributes map is un-initialized.
    bike.addAttribute("color", "blue");
}
```
(290)

FIG. 6D

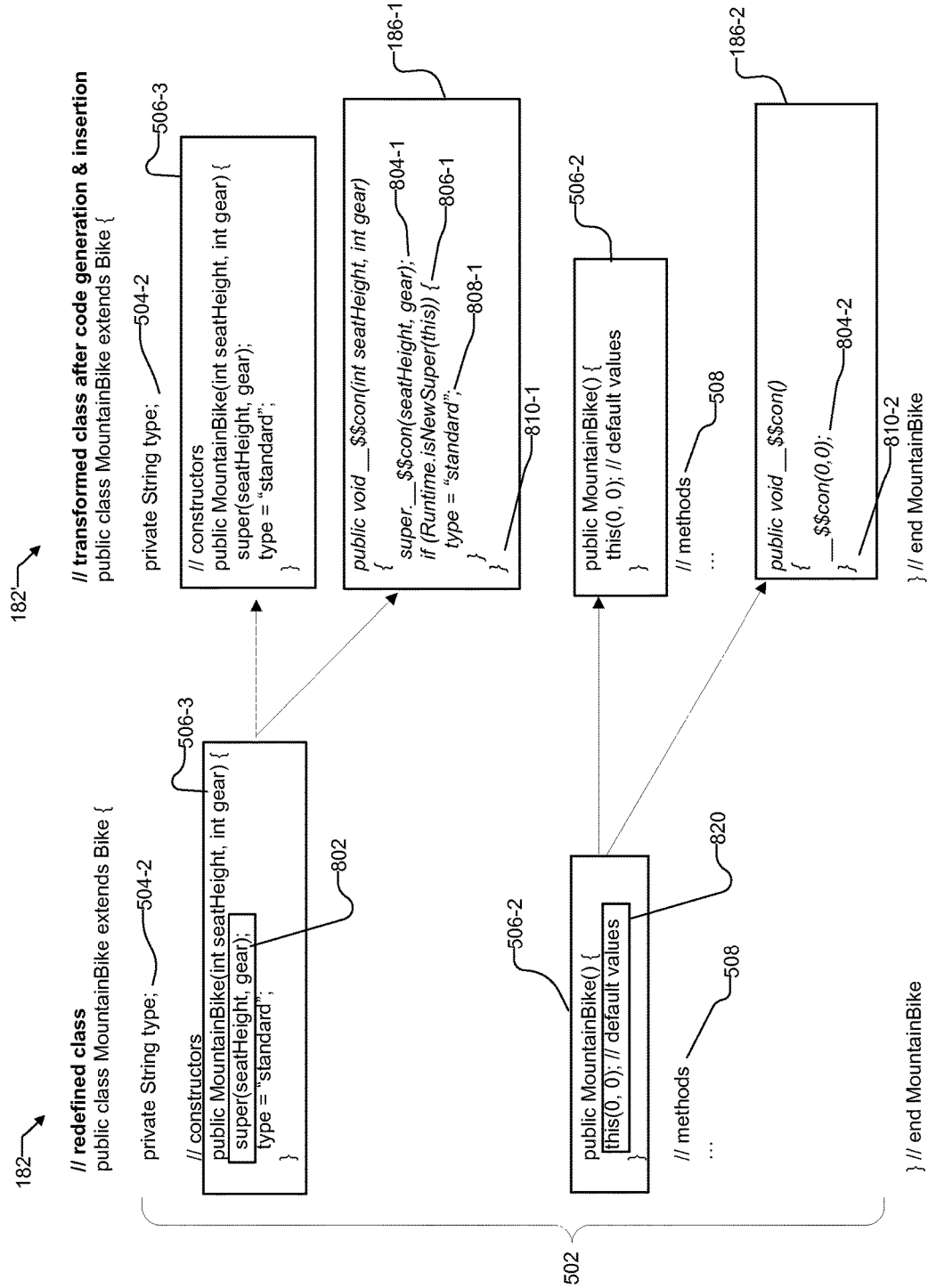

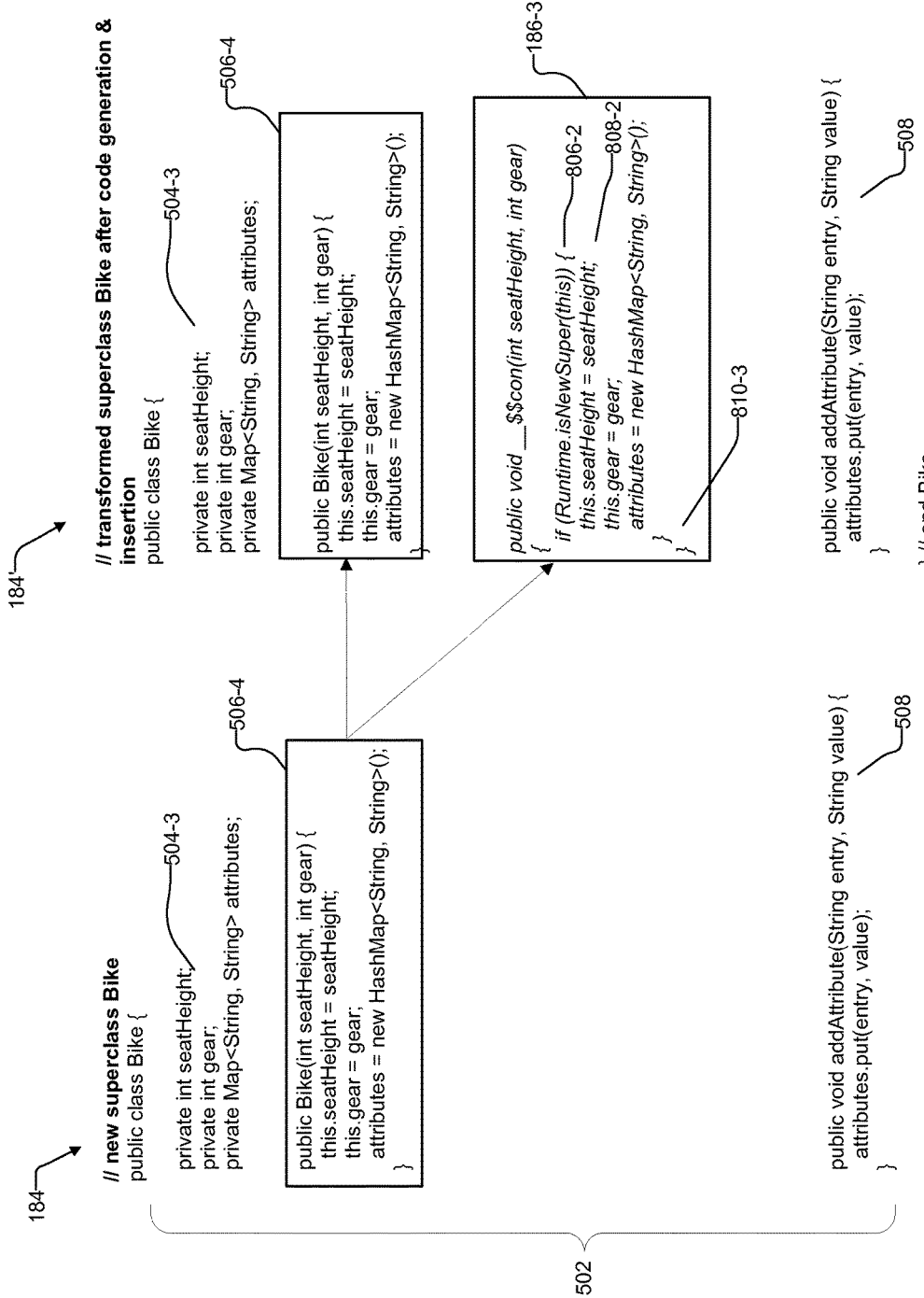

290 ↘

```
// example program execution after redefinition

// get the first bike stored in shop
                                    ╱─512-1
for(Bike bike : getAllBikes()) {───
  // for existing mountain bike objects, gives
  // null pointer exception since object was
  // created before it had Bike super class
  // so attributes map is un-initialized.
                                    ╱─514
  bike.addAttribute("color", "blue"); ──╱
}
```

FIG. 7E

```
Runtime.onFirstUsage(Object obj) {
  if(hasSuperChanged(obj)) {
    ((SpecialInterFace) obj).__$$con();
  }
}
```

// for existing MountainBike objects this results in the following execution chain:

//1.    MountainBike.__$$con();        ────850
//2.    MountainBike.__$$con(0,0);
//3.    Bike.__$$con(0,0);

//Only for case 3 does the Runtime.isNewSuper() method return true, meaning that the code
//that initializes the attributes map is executed and no null pointer exception is thrown at runtime.

FIG. 7F

SYSTEM AND METHOD FOR AUTOMATIC INVOCATION OF CONSTRUCTOR CODE FOR SUPERCLASSES

RELATED APPLICATIONS

This application claims the benefit under 35 U.S.C. §119(e) of U.S. Provisional Application No. 61/660,002, filed on Jun. 15, 2012, which is incorporated herein by reference in its entirety.

BACKGROUND OF THE INVENTION

A platform is a combination of hardware architecture and/or software platform that enables software to run on user devices, such as desktop computers, mobile phones, and tablets. Software platforms are typically a combination of software libraries and other executables that present well-defined Application Programming Interfaces ("API"). Software developers are increasingly utilizing modern software platforms to enable the creation of platform-independent applications. Modern software platforms typically include a programming language, the compiled output of which executes within the context of machine-dependent programs, known as virtual machines ("VM").

A VM is a software program or library that permits an isolated processing environment to exist on a computer system. VMs hide or abstract the details of the underlying computer system from the software that executes within each VM. To create platform-independent applications, software developers use platform tools to compile the programming language source code into the software executable that runs on the VMs, also known as bytecode.

Bytecode is typically a set of binary files that include platform-neutral instructions for implementing application behavior. The VMs interpret the bytecodes, and execute corresponding native instructions on the target computer system associated with the bytecodes. Examples of software platforms that enable the creation of computer system-independent applications include the Java and .Net platforms.

Java is a registered trademark of Oracle Corporation. Oracle associates the Java trademark with its eponymous computer programming language, Java Virtual Machine ("JVM,") and related infrastructure and tools. .Net is a registered trademark of Microsoft Corporation. For .Net, Microsoft provides its C# programming language, .Net runtime virtual machine, and related infrastructure and tools.

The Java programming language and runtime package support the tenets of object-oriented programming, which includes the principles of inheritance, polymorphism, and data hiding. Java organizes programming objects into conceptual classes, and saves the compiled bytecode for its classes into data files, also known as class files. With respect to inheritance, Java objects (or classes of objects) inherit properties and behaviors in a parent/child relationship, also referred to as superclass/subclass, respectively.

Java creates an instance of a particular class object via a process called instantiation. The phrase "instantiating a class" means the same thing as "creating an object." An object is an instance of a class. The instantiation process involves allocating memory for the new instance to exist. Java accomplishes this by invoking a special method defined by each class, called a constructor. A class object includes one or more constructors. The body of the constructor also provides the ability to initialize the data members of the class. For these reasons, constructors are also referred to as object initializers, and the software code within the body of the constructors as object initialization code.

A superclass is a class that has been extended by another class. This allows the extending class, also known as the subclass, to inherit the state and behaviors of the superclass. Subclasses form chains with one or more superclasses to create inheritance hierarchies, or inheritance chains.

In an inheritance hierarchy, a superclass may itself inherit information from another superclass. When analyzing classes in an inheritance hierarchy, it is important to traverse the entire chain of classes in the hierarchy to preserve the data and relationships between the classes. These are also referred to as class hierarchies.

The classes towards the top of an inheritance hierarchy tend to be abstract classes that typically do not have any objects instantiated from them. The bottom-most classes of the hierarchy are typically the concrete classes, or declaring classes, from which applications create objects that accomplish the useful work of an application.

Redefinition of classes is a well-known practice. In Java, the HotSpot VM has provided the ability to redefine classes at runtime since JDK 1.4. This functionality is based on the work of Mikhail Dmitriev, from "Safe Class and Data Evolution in Large and Long-Lived Java Applications," PhD thesis, University of Glasgow, 2001. This functionality is better known as HotSwap. In addition, a publication by Allan Raundahl Gregersen, "Extending NetBeans with Dynamic Update of Active Modules," PhD thesis, University of Southern Denmark, 2010, discusses dynamic update of code modules using the NetBeans development platform. NetBeans is a registered trademark of Oracle, Inc.

SUMMARY OF THE INVENTION

While HotSwap provides the ability to change the code bodies of methods within an existing class, and add new classes, HotSwap does not support changing the superclass of a class or any inheritance-related information at runtime. More recent approaches have been suggested that do support changes to the superclass, but these approaches have significant limitations.

In Thomas Würthinger's "Dynamic Code Evolution for Java." PhD thesis, Johannes Kepler University Linz, April 2011, Würthinger discloses the Dynamic Code Evolution VM product, which is a patch against JDK 7 and JDK 6 that enhances the HotSwap feature with enhanced class redefinition capabilities. One of the class redefinition features is the ability to change the superclass. The Dynamic Code Evolution VM is able to perform class type widening, meaning the ability to inject one or more superclasses. In addition, the Dynamic Code Evolution VM is able to perform type narrowing under some assumptions.

In Würthinger's thesis, the issues involved in type narrowing changes are discussed in extensive detail. On the contrary, no issues are mentioned regarding type widening, to which the present invention can have applicability. A major issue is that partially uninitialized objects can exist after a type widening class redefinition of a subclass using the Dynamic Code Evolution VM.

In Mario Pukall's, "JAVADAPTOR: Unrestricted Dynamic Updates of Java Applications." PhD thesis, University of Magdeburg, Germany, March 2012, Pukall discloses the JavAdapter product, that also claims the ability to support the redefinition of superclasses. As with Würthinger, however, Pukall does not examine the potential for uninitialized objects to exist subsequent to a type widening class redefinition.

Other dynamic class redefinition systems exist, but none other than the aforementioned approaches supports changes to the superclass. Moreover, because the Würthinger and Pukall approaches do not adequately handle the case of type widening of superclass constructors during class redefinition, these approaches only provide a partial solution to the problem of dynamic class redefinition.

The present invention relates to the ability to dynamically redefine classes in a running application. More particularly, the present invention can enable automatic invocation of all or some of the constructors in the chain of superclasses for objects that have changed the superclass at runtime by a class redefinition.

The present invention concerns applications created from statically-typed, class-based object-oriented programming languages. The classes of the applications are typically included in class files. The invention provides a system and method for changing the contents of superclasses of the classes for the applications at runtime, utilizing class redefinition methods within the classes to modify the superclasses, in one example. The ability of the invention to modify superclasses at runtime provides significant advantages over present approaches to dynamic class redefinition.

The system dynamically reconstructs the current contents of objects of the declaring class. During the reconstruction, the system first identifies the code associated with the set of superclass constructors that were not originally part of the objects' class hierarchy. This is also referred to as newly-found class code.

Then, the system searches for at least one default constructor within the classes of the class hierarchy of the declaring class. A default constructor is a constructor with zero arguments.

The default constructor can exist in any class in the class hierarchy of the declaring class.

If the system successfully locates a default constructor, the system then redefines the set of classes associated with the declaring class and its existing class hierarchy to incorporate the newly-added superclasses into the class hierarchy.

The redefined set of classes includes the original contents of each class, and additional code generated by the system. For each redefined class, the system generates superclass constructors for the newly-found class code, and relevant code statements to invoke the superclass constructors for the newly-found class code. In this way, the system creates new class inheritance chains that incorporate newly-added superclasses added at runtime for existing objects.

The system starts the search for the default constructors beginning from the declaring class upwards. Ideally, the default constructor is located in the lowest new superclass of the declaring class within the inheritance chain.

Current solutions to runtime class redefinition are especially susceptible to variable initialization issues when new superclasses are added. Often there are implicit assumptions within methods declared by the new superclasses about the range of possible values for the member variables of the new superclasses.

These implicit assumptions are compounded by the fact that constructors declared within the set of new superclasses have not yet executed. Typically, such assumptions lead to programming errors such as null pointer exceptions. This is because programming languages typically initialize the data members of classes to their corresponding programming language default values, such as NULL or primitive equivalent.

The present invention can be used to avoid these pitfalls by automatically invoking the associated constructor of each new superclass during the class reconstruction process.

In general, according to one aspect, the present invention features a method for automatically invoking object initializers of superclasses added to the inheritance hierarchy of existing objects. The method comprises dynamically updating class definitions of the existing objects, traversing an inheritance hierarchy of the existing objects to identify all superclasses added by the dynamic update, identifying one or more object initializers for each of the superclasses, and invoking the object initializers of the superclasses to initialize the code for each of the superclasses.

In one example, identifying one or more object initializers for each of the superclasses is accomplished during the creation of an object for each superclass, by analyzing the object initializers of the subclass of each created superclass object in the inheritance hierarchy of each created superclass object.

The method further comprises invoking the object initializers for each of the superclasses in the order specified by the inheritance hierarchy of each created superclass object in some cases.

The method can also further comprise creating code for class redefinition methods for each of the superclasses from the code of object initializers for each of the superclasses and from the code of the object initializers of the subclass of each created superclass object, and adding the class redefinition methods to the classes for each of the superclasses. The act of adding the class redefinition methods to the classes for each of the superclasses results in transformed superclasses.

In one implementation, the method further comprises invoking the class redefinition methods for each of the transformed superclasses to initialize the code for each of the transformed superclasses. Preferably, the dynamic updating of the class definitions of the existing objects accepts redefined classes for the existing objects.

The method can include the creation of code for class redefinition methods from the code of object initializers for each of the superclasses and from the code of the object initializers of the subclass of each created superclass object, and adds the class redefinition methods to the redefined classes for the existing objects. The adding of the class redefinition methods to the redefined classes for the existing objects results in transformed redefined methods for the existing objects.

Typically, the method further comprises invoking the class redefinition methods for each of the transformed redefined classes for the existing objects to initialize the code for each of the transformed redefined classes. Preferably, the method identifies object initializers for each of the new superclasses that include zero arguments.

The method can further include identifying object initializers for each of the new superclasses using information supplied in an application.

The method can be performed via software running within, or as an extension of, a virtual machine.

The method can transform bytecode of one or more of the superclasses, the transforming of the bytecode enables the invoking of the object initializers of the superclasses to initialize the code for each of the superclasses.

In general, according to another aspect, the invention features a system for automatically invoking object initializers of superclasses added to the inheritance hierarchy of existing objects of an application running on a computing device. The system includes a class loader executing on the computing device for loading dynamically updated class definitions of the existing objects. The system also includes a class file transformer that traverses the inheritance hierarchy of the existing objects to identify all superclasses added by the dynamic update, and identifies one or more object initializers for each of the superclasses. In addition, the system includes a declaring class interceptor that invokes the object initializers of the superclasses identified by the class file transformer to initialize the code for each of the superclasses.

Objects in a statically-typed, class-based object-oriented programming language are constructed by a chain of constructors which is executed once for each object. Constructors are special methods that are only allowed to execute once. Therefore, any attempt to execute constructors directly for an already initialized object will fail. The code of every constructor is usually duplicated with slight modifications into equivalent redefinition methods that are allowed to run even for existing objects. Therefore, the present invention can enable execution of constructor code, represented by the generated redefinition methods, for objects that are partially uninitialized due to a changed set of superclasses.

The systems implementing the invention preferably operate on top of a class redefinition system capable of redefining the superclass of a class. In embodiments, the code of each constructor for all loaded classes is transformed just before class load time into a corresponding redefinition method. If the class hierarchy for an object has at least one constructor with zero arguments, the systems search the specific object's declaring class upwards to each superclass in the chain of superclasses, and invokes the redefinition method that corresponds to the first zero argument constructor. The redefinition method is invoked at a point in time after or during class redefinition for each object having been created before a class redefinition of the declaring class.

Code can be generated within the redefinition method to invoke the redefinition method corresponding to that other specific constructor which is invoked at the beginning of the constructor being transformed. Code is then inserted to check if the declaring class of the said class redefinition method belongs to the set of new superclasses for the said specific object's declaring class, and if so continues execution of the code copied from the said constructor code. If not, then further execution is omitted.

The tasks associated with transforming the constructor code can be equally performed as part of a modified Java Virtual Machine.

The tasks associated with transforming the constructor code can be equally performed by a special-purpose Java agent that intercepts class loading events.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 6A-6D provide sample code for the existing and redefined classes in the example of FIG. 5A, and include sample test code executed at runtime to declare an instance of a redefined class ("declaring class"); and FIGS. 7A-7F provide sample code for the existing and redefined classes example of FIG. 5B, illustrating how the transforming agent modifies the code for the existing and redefined classes to overcome the limitations of current class redefinition approaches, and includes sample test code executed at runtime to declare an instance of a redefined class ("declaring class").

DETAILED DESCRIPTION OF THE PREFERRED EMBODIMENTS

Figure 1:
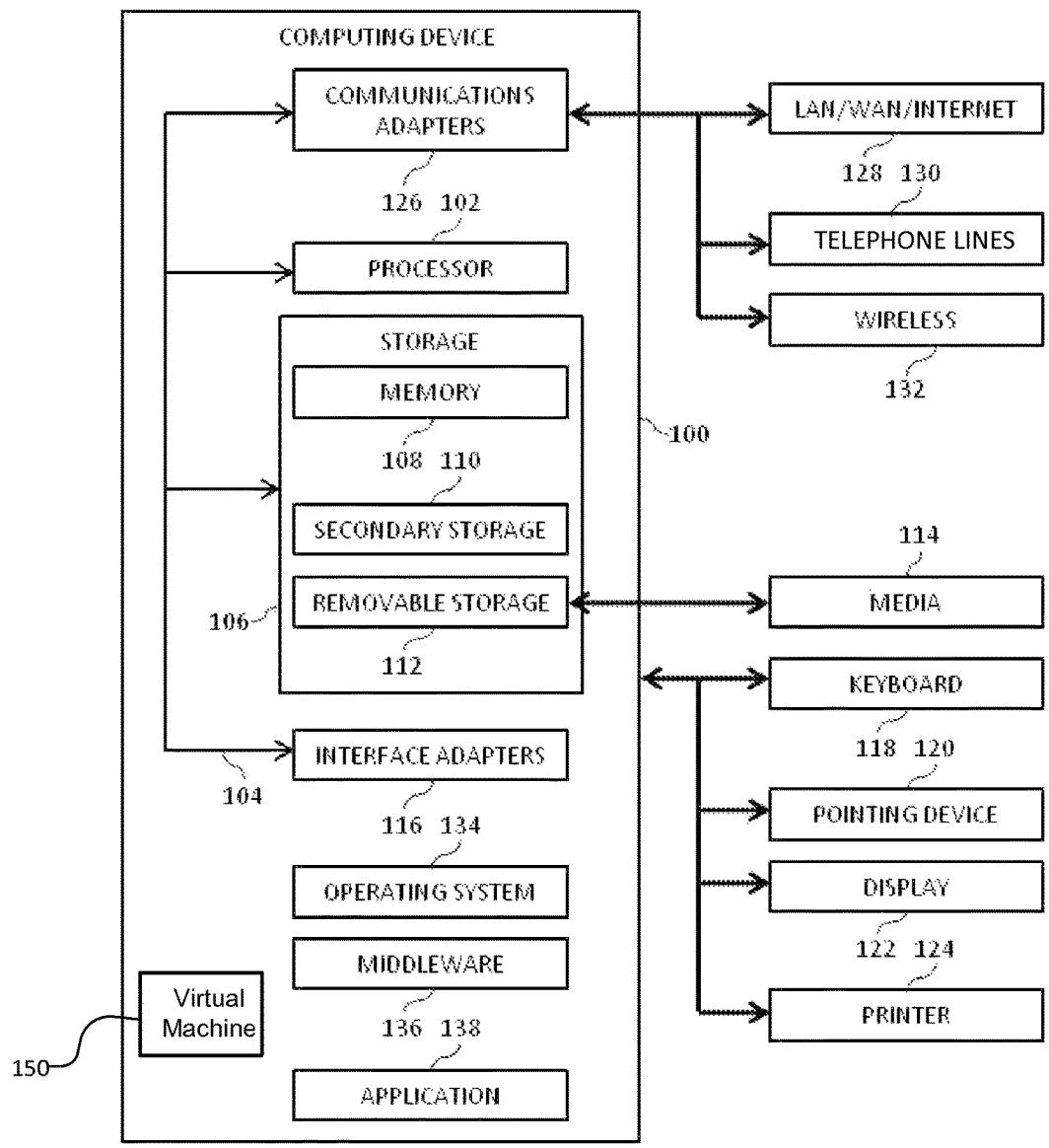
FIG. 1 is a block diagram of a generic computing device, such as a desktop, workstation, server, mainframe computer, embedded computing device, etc., wherein the present invention may be practiced.

FIG. 1 is a block diagram of a computing device, such as a workstation, wherein the present invention may be practiced. The environment of FIG. 1 comprises a single representative computing device 100, such as a personal computer, workstation, enterprise mainframe computer, server, laptop, hand-held computer, information appliance, etc., including related peripheral devices. The computing device 100 includes a processor 102 such as a microprocessor, and a bus 104 to connect and enable communication between the processor 102 and the components of the computing device 100 in accordance with known techniques. Note that in some computing devices there may be multiple processors incorporated therein.

The processor 102 communicates with storage 106 via the bus 104. Memory 108, such as Random Access Memory (RAM), Read Only Memory (ROM), flash memory, etc. is directly accessible while secondary storage device 110, such as a hard or solidstate disk, and removable storage device 112, such as a floppy diskette drive, CD ROM drive, tape storage, USB memory stick, etc. is accessible with additional interface hardware and software as is known and customary in the art. The removable storage device 112 will have associated therewith an appropriate type of removable media 114, such as a diskette, CD, tape reel or cartridge, solid state storage, etc. that will hold computer useable data and is a form of computer useable medium. Note that a computing device 100 may have multiple memories (e.g., RAM and ROM), secondary storage devices, and removable storage devices (e.g., floppy drive, CD ROM drive and USB memory stick).

The computing device 100 typically includes an interface adapter 116 such as a user interface adaptor that connects the processor 102 via the bus 104 to one or more user interface devices, such as a keyboard 118, a mouse or other pointing device 120, a display 122 (such as a CRT monitor, flatpanel (LCD) screen, etc.), a printer 124, or any other user interface device, such as a touch sensitive screen, digitized entry pad, etc. Note that the computing device 100 may use multiple interface adapters 116 in order to make the necessary connections with the user interface devices.

The computing device 100 also commonly communicates with other computing devices, computers, workstations, etc. or networks thereof through a communications adapter 126, such as a telephone, cable, or wireless modem, ISDN Adapter, DSL adapter, Local Area Network (LAN) adapter, or other communications channel. This gives the computing device direct access to networks 128 (LANs, Wide Area Networks (WANs), the Internet, etc.), telephone lines 130 that may be used to access other networks or computers, wireless networks 132, such cellular telephone networks, and other communication mechanisms. Note that the computing device 100 may use multiple communication adapters for making the necessary communication connections (e.g., a telephone modem card and a Cellular Digital Packet Data (CDPD). The computing device 100 may be associated with other computing devices in a LAN or WAN, or the computing device can be a client or server in a client/server arrangement with another computer, etc. All these configurations, as well as the appropriate communications hardware and software, are known in the art.

The computing device 100 provides the facility for running software, such as Operating System software 134, Middleware software 136, and Application software 138. A virtual machine 150 is a special example of application software 138. Note that such software executes tasks and may communicate with various software components on this and other computing devices 100. The computing device 100 also includes a virtual machine 150.

As will be understood by one of ordinary skill in the art, computer programs such as that described herein (including Operating System software 134, Middleware software 136, and/or Application software 138) are typically distributed as part of a computer program product that has a computer useable media or medium containing or storing the program code. Therefore, "media", "medium", "computer useable medium", or "computer useable media", as used herein, may include a computer memory (RAM and/or ROM), a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a DVD, CD Rom, diskette, hard drive and the like, as well as other non-palpable physical media, such as a carrier signal, whether over wires or wireless, when the program is distributed electronically. Note also that "servlets" or "applets" according to Java technology available from Oracle, Inc. would be considered computer program products.

Although the enabling instructions might be "written on" on a diskette or tape, "stored in" an integrated circuit or PLA, "carried over" a communications circuit or wireless network, it will be appreciated, that for purposes herein, the computer useable medium will be referred to as "bearing" the instructions, or the instructions (or software) will be referred to as being "on" the medium. Thus, software or instructions "embodied on" a medium is intended to encompass the above and all equivalent ways in which the instructions or software can be associated with a computer useable medium.

For simplicity, the term "computer program product" is used to refer to a computer useable medium, as defined above, which bears or has embodied thereon any form of software or instructions to enable a computer system (or multiple cooperating systems) to operate according to the above-identified invention.

It will be likewise be appreciated that the computer hardware upon which the invention is effected contains one or more processors, operating together, substantially independently, or distributed over a network, and further includes memory for storing the instructions and calculations necessary to perform the invention.

Those skilled in the art will recognize that a method according to the present invention may be created in a variety of different ways known in the art. For example, a general purpose computing device 100 as described in FIG. 1 may be configured with appropriate software so that the computing device 100 functions as described hereafter. Furthermore, discrete electronic components may be used to create a system or computer program product that implements all or part of the functional. Finally, note that combinations of multiple computing devices 100 running appropriate software or discrete electrical components can be used in like fashion. Essentially, the hardware is configured (whether by software, custom designed, etc.) to perform the functional elements making up the present invention.

Figure 2:
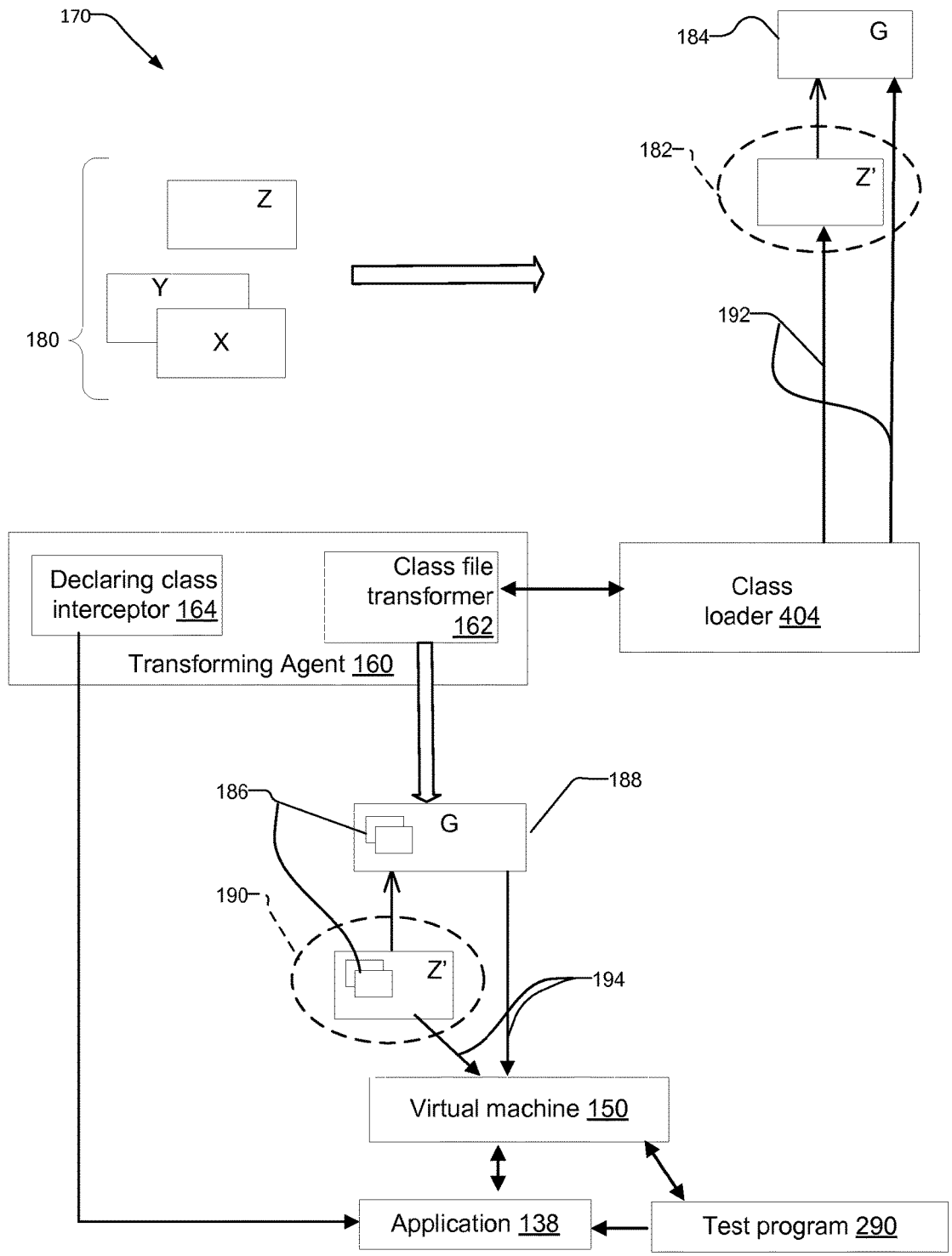
FIG. 2 is a block diagram showing the interactions between the major components of the present invention for performing an exemplary dynamic class update of existing application objects, when the updates include redefined classes for the existing objects having new superclasses.

FIG. 2 shows a block diagram showing a dynamic program update 170 to original classes 180 of an application 138 running on a virtual machine 150 according to a preferred embodiment of the invention. A transforming agent 160 includes a class file transformer 162 ("transformer") and a declaring class interceptor 164 ("interceptor.") Prior to the dynamic program update 170, a class loader 404 loads the class files associated with the original classes 180, identified as class files X, Y, and Z in FIG. 2.

The dynamic program update 170 includes changes to one or more of the original classes 180, such as redefined class 182 for original class Z, and can include one or more new superclasses 184, identified as class G, in one example. Redefined class 182 is also identified as Z' to indicate that it represents a redefined version of original class Z. The class loader 404 loads class files for classes Z' and G in response to the dynamic program update 170.

A class file is updated when the user specifies changes to the class files of one or more of the original classes 180, where the changes redefine the classes at runtime. The class file transformer 162 of the transforming agent 160 transforms newly-added classes G and Z' as they are loaded by the class loader 404.

Specifically, the redefined classes 182 are those classes for which the user changes or adds new class inheritance relationships. Examples include changing the content of original classes 180, such as Z, to create redefined classes 182, such as Z', and adding a new superclass 184, such as G, to redefined class Z'.

The transformer 162 applies its code transformation to all classes in the system as the classes are loaded by the class loader 404. For the code transformation, the transformer 162 generates code for new helper methods, called redefinition methods 186, and copies the code for the redefinition methods 186 into the classes of certain redefined classes 182 and new superclasses 184, in one example.

In FIG. 2, original classes 180 labeled X, Y, and Z undergo a dynamic class update 170. At runtime, the user redefines class Z, labeled as redefined class 182 Z', to be a subclass of new superclass 184 G. Before the class loader 404 can load the bytecodes 192 associated with redefined class 182 Z' and new superclass 184 G into virtual machine 150, the transformer 162 intercepts the class loader 404.

The classes modified by the transformer 162 to include the redefinition methods 186 are referred to as transformed classes 190, and transformed superclasses 188. The bytecodes 192 that result from the transformed classes 190 and the transformed superclasses 188 are referred to as transformed bytecodes 194. Finally, the transformer 162 loads the transformed bytecodes 194 into the virtual machine 150, such as a Java Virtual Machine, which executes the instructions for the application 138 on the computing device 100.

When invoked, the redefinition methods 186 perform tasks such as initializing the member variables, or attributes 504, for certain classes of objects that would otherwise be uninitialized during the dynamic class update 170 using current approaches to class redefinition.

During execution of the application 138, or execution of a test program 290 that references objects of the application, the runtime environment of the virtual machine 150 encounters code of the application 138 that declares instances of objects, also known as the "declaring class" 512 of an object. The interceptor 164 first locates the class associated with the declaring class 512.

Then, the interceptor 164 makes decisions as to whether the classes for the declaring class 512 include redefinition methods 186, and whether to invoke those redefinition methods 186. The invocation of the redefinition methods 186 during the instantiation of declaring class objects 512 initializes data members of the redefined classes 182, and classes within the class hierarchies of the redefined classes.

More details will be provided for the creation and usage of the redefinition methods 186 in the descriptions that accompany the remaining figures.

In the preferred embodiment, the transforming agent 160 is implemented as a software module or application 138 running within the operating system 134 of a computing device 100, such as a computer workstation, network appliance, or tablet device. In another implementation, the transforming agent 160 is implemented within a virtual machine ("VM") 150 of the computing device 100, such as a Java Virtual Machine.

Figure 3:
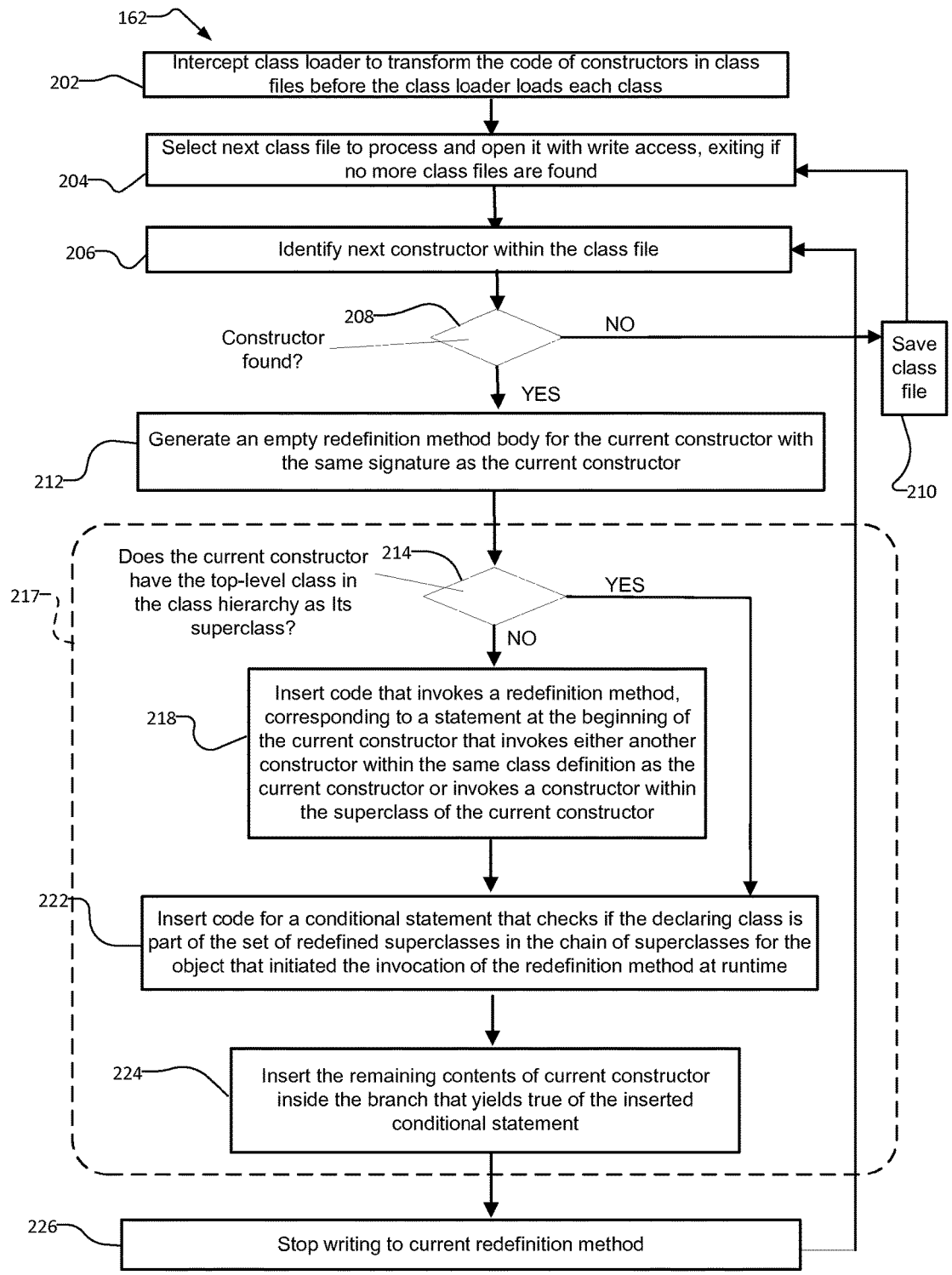
FIG. 3 is a flowchart showing the method associated with a preferred embodiment of the present invention, for a class file transformer of a transforming agent that creates class redefinition methods from the constructor code of each class in an application using the class file transformer.

FIG. 3 is a flowchart showing one method of operation for the class file transformer 162 ("transformer") of the transforming agent 160 to copy and transform the constructor code for all relevant classes of an existing application 138 to create class redefinition methods 186 within those classes. This exemplary method for the transformer 162 is also referred to as the "transformer method."

In step 202, the transformer 162 intercepts the class loader 404 to transform the code of constructors in class files before the class loader 404 loads each class. In step 204, the transformer 162 selects the next class file to process, and opens it with write access, exiting if no more class files are found. According to step 206, the transformer 162 attempts to identify the next constructor within the class file. If the transformer 162 does not find a constructor within the class file in step 208, the transformer 162 saves the contents of the class file in step 210, and moves to the next class file in step 204.

If the transformer 162 identifies a constructor within the class file in step 208, the transformer 162 continues to step 212, where the transformer 162 generates an empty redefinition method body 186 for the current constructor with the same signature as the current constructor.

Step 217 includes all steps associated with generating and inserting code statements into the redefinition methods 186 created in step 212. Step 217 encapsulates the actions for steps 214, 218, 222, and 224.

Steps 214 and 218 involve the first code insertion action for the created redefinition method 186. In step 214, the transformer 162 checks if the currently processed constructor has the top-level class of the class inheritance hierarchy as its superclass. For each redefinition method 186 created in step 212, the result of step 214 determines the content of statements that the transformer 162 inserts within the body of each redefinition method 186.

Step 214 first determines if the class for the current constructor has the top-level class in the class inheritance hierarchy as its superclass, which in the java programming language is java.lang.Object. If this statement is true, this indicates the end of the chain of superclasses, and the transformer 162 transitions to step 222. Otherwise, the transformer 162 transitions to step 218.

In step 218, the transformer 162 inserts code that invokes a redefinition method 186, corresponding to a statement at the beginning of the current constructor that invokes either another constructor within the same class definition as the current constructor, or invokes a constructor within the superclass of the current constructor. At the conclusion of step 218, the transformer 162 transitions to step 222 to process the second code insertion action.

In step 222, the transformer 162 inserts code for a conditional statement that checks if the declaring class is part of the set of redefined superclasses in the chain of superclasses for the object that initiated the invocation of the redefinition method at runtime. The transformer 162 then proceeds to step 224.

According to step 224, the transformer 162 inserts the remaining contents of the current constructor inside the branch that yields true of the inserted conditional statement from step 222. Then, the transformer transitions to step 226 to stop writing to the current redefinition method 186.

When the transformer 162 stops writing to the current redefinition method 186 in step 226, the transformer 162 then transitions back to step 206 to find the next constructor within the class file for the current class. When the transformer 162 cannot find any more constructors in the class file in step 208, the transformer 162 saves the class file in step 210, and then selects the next class file to process in step 204. The transformer 162 in step 204 exits when it cannot find any more class files to process.

Figure 4:
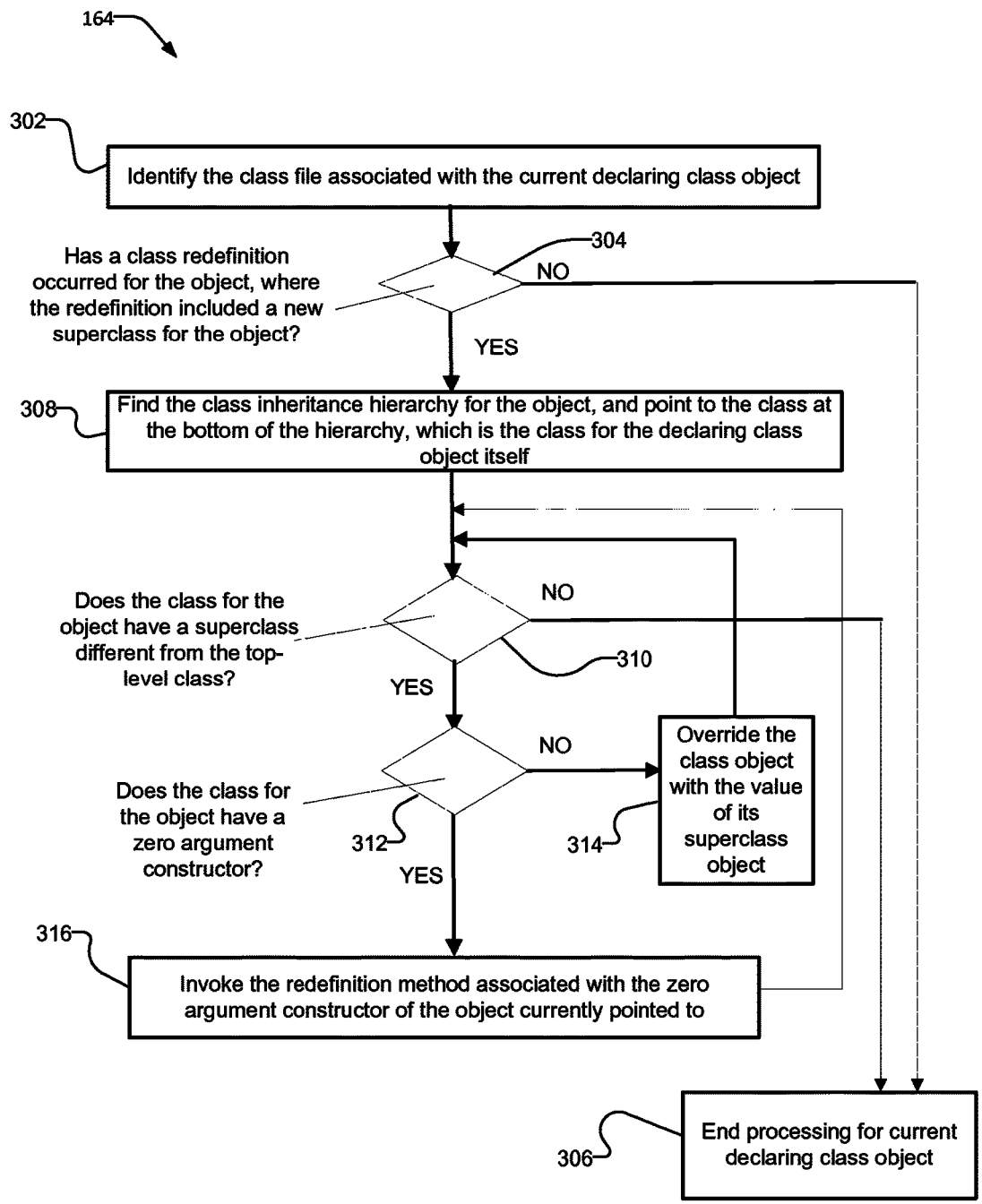
FIG. 4 is a flowchart showing the method associated with a preferred embodiment of the present invention, for a declaring class interceptor of the transforming agent that locates and invokes the class redefinition methods created for objects, when the classes for those objects have been redefined with a new set of superclasses at runtime.

FIG. 4 is a flowchart showing one method of operation for the declaring class interceptor 164 ("interceptor") of the transforming agent 160 that locates and invokes the class redefinition methods 186 created by the transformer 162. The exemplary method for the interceptor 164 is also referred to as the "interceptor method."

The interceptor 164 operates upon declaring class objects, when the classes for the declaring class objects have been redefined with a new set of superclasses. An example of a declaring class object that meets these criteria is described in detail in the example in FIG. 5B and associated FIGS. 7A-7F, but is briefly included here for convenience.

For example, if class "MountainBike" was a stand-alone class as part of an original application, and the user attempts a dynamic class update that injects new superclass "Bike" and redefines class "MountainBike" as a subclass of superclass "Bike," a runtime execution code snippet in the application, such as Bike myBike;

provides a declaring class of Bike associated with object instance myBike.

In step 302, the interceptor 164 identifies the class file associated with the current declaring class object referenced in the running program. Then, in step 304, the interceptor 164 determines if a class redefinition has occurred for the object, where the redefinition included a new superclass for the object. If this statement is false, the interceptor 164 ends processing for the current declaring class object in step 306. If this statement is true, the interceptor 164 proceeds to step 308 to find the class inheritance hierarchy for the object, and point to the class at the bottom of the hierarchy, which is the class for the declaring class object itself.

If the interceptor 164, in step 310, indicates that the current class for the object has a superclass different from the top-level class, then the interceptor 164 proceeds to step 312. If this is not the case, the interceptor 164 ends processing for the current declaring class object in step 306.

According to step 312, the interceptor 164 searches the class to find a zero argument constructor. If the class does not have a zero argument constructor, the interceptor 164 does not invoke any redefinition methods for the current class, and transitions to step 314. In step 314, the interceptor overrides the declaring class object with the value of its superclass object.

When step 314 completes, the interceptor 164 repeats the check in step 310 to check the class for the object, which is now the superclass of the original declaring class object. In this way, the interceptor 164 iteratively moves up to the next superclass in the declaring class object's inheritance hierarchy until the top class of the inheritance hierarchy is reached.

If the interceptor 164 in step 312 does find a zero argument constructor for the current object associated with the declaring class, the interceptor 164 proceeds to step 316 to invoke the redefinition method associated with the zero argument constructor of the object currently pointed to. Upon completion of step 316, the interceptor 164 transitions back to step 310 to locate the next superclass in the declaring class object's class inheritance hierarchy, invoking the associated redefinition methods for all classes in the inheritance chain for the declaring class object.

It is important to note that the redefinition methods themselves create the chain of invocations, and the interceptor performs the invocations by executing the redefinition methods. When the bottom-most redefinition method is invoked, the interceptor 164 will invoke the included superclass redefinition method as if it were a constructor.

In another embodiment, a pure Java Virtual Machine implementation looks for the constructors it needs to invoke after redefinition, without the need to insert any generated code into the class definitions at load-time.

Figure 5A:
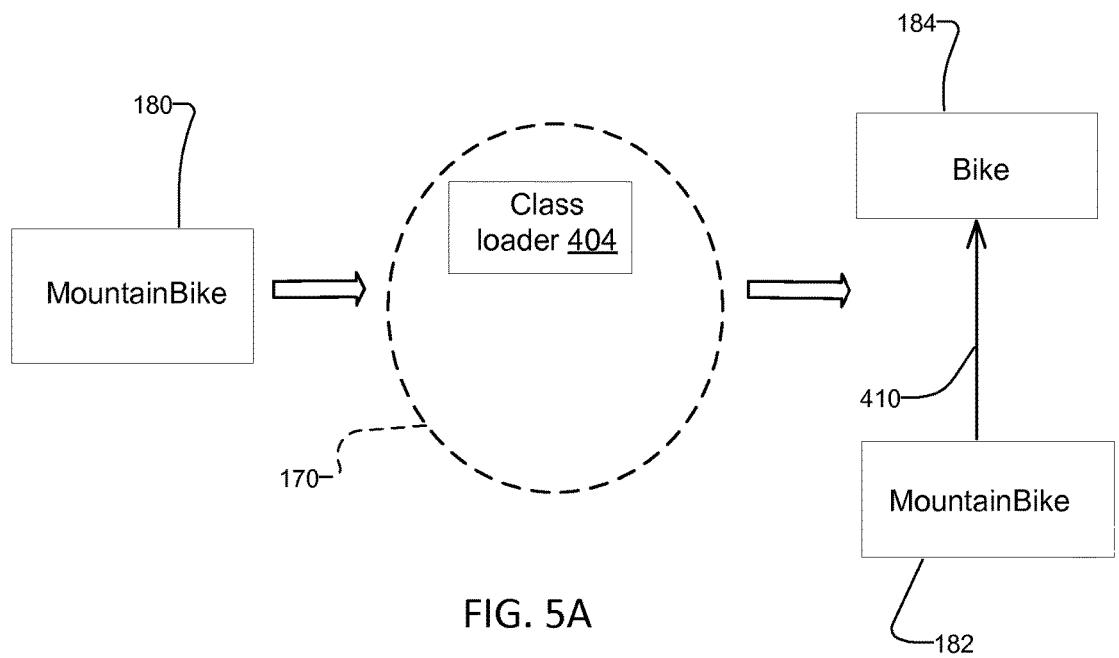
FIG. 5A provides an example class diagram for illustrating problems associated with dynamic class updates, when the user redefines existing classes to include new superclasses added to the inheritance hierarchy for already instantiated objects of the existing classes, and loads the classes with a standard class loader.

FIG. 5A provides a class diagram for an example application that illustrates the problems with current class redefinition approaches when the user dynamically loads redefined classes that add superclasses to the original classes. Typically, with current approaches to class redefinition, any class redefinition that changes the inheritance relationships of the original classes is likely to cause problems, because the existing objects associated with the original classes have no way of updating their state to incorporate or initialize the new attributes and class constructor information of the newly added classes.

In the example, original class "MountainBike" 180 is part of an application 138 running on a computing device 100, in one implementation. The classes for the application 138 are subjected to a dynamic program update 170 by a class loader 404 when a user, at runtime, provides updates to the original classes 180. The updates include redefined class "MountainBike" 182, and the introduction of a new superclass "Bike" 184.

According to object-oriented programming terminology, redefined class MountainBike 182 is now a subclass of new superclass Bike 184, where redefined class MountainBike 182 inherits 410 information from new superclass Bike 184. New superclass Bike 184 is also referred to as a parent class of redefined class MountainBike 182.

During the dynamic program update 170, the class loader 404 loads the classes for the new superclasses 184 and the redefined classes 182.

The descriptions associated with FIGS. 6A-6D provide sample code, in one implementation, using the Java programming language. The code samples in FIGS. 6A-6D illustrate some of the problems associated with adding new superclasses 184 for existing objects subjected to a class redefinition of classes for the existing objects, with reference to the class diagram of FIG. 5A.

Figure 5B:
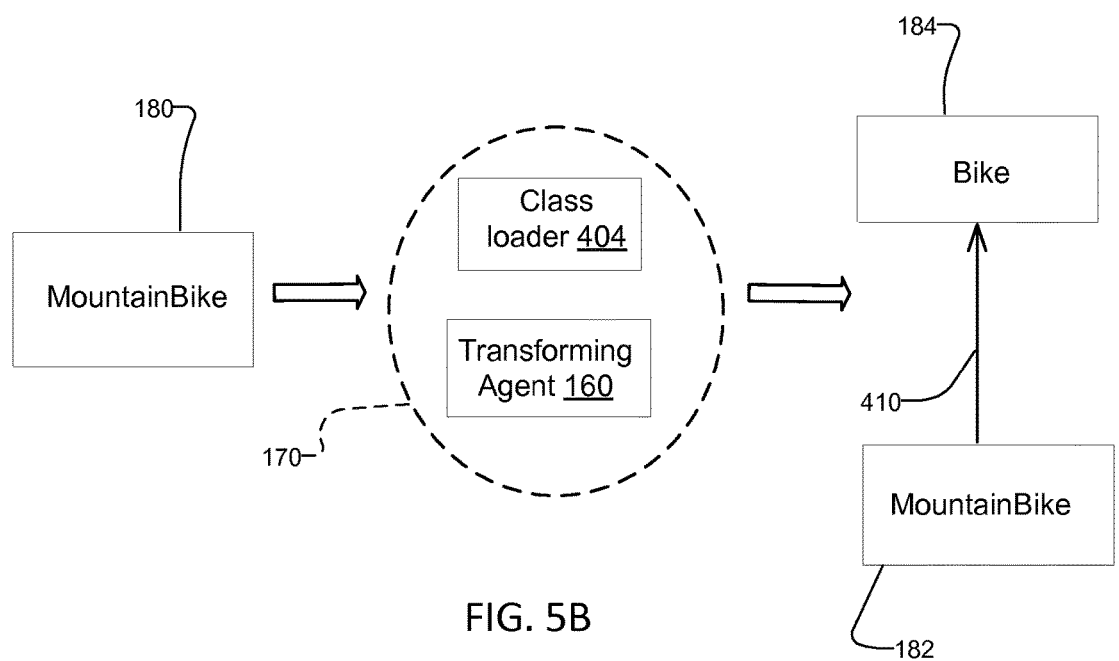
FIG. 5B provides the same example set of classes as in FIG. 5A, but employs the transforming agent of the present invention that works with the class loader to overcome the problems associated with the dynamic class updating scheme of FIG. 5A.

FIG. 5B provides a class diagram for an example application that is identical to the example provided in FIG. 5B, with the exception that the transforming agent 160 intercepts the class loader 404 and augments its capabilities to overcome the problems raised for the example in FIG. 5A.

The descriptions associated with FIGS. 7A-7F provide sample code, in one implementation, using the Java programming language. The code samples in FIGS. 7A-7F illustrate how the invention can be used to overcome the problems raised for the FIG. 5A example associated with current class redefinition approaches. The code samples in FIGS. 7A-7F reference the class diagram of FIG. 5B.

Figures 6A, 6B:
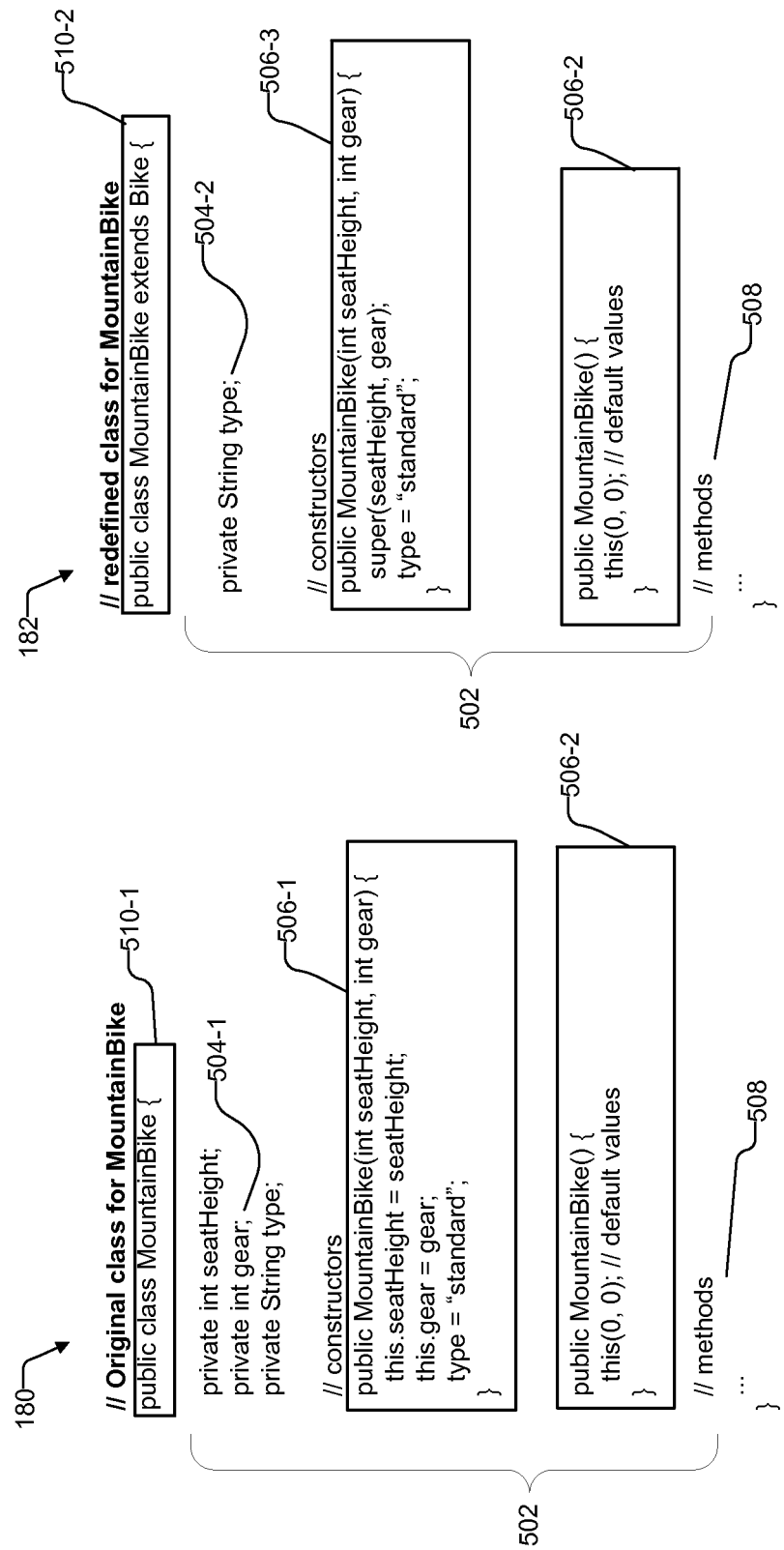

FIG. 6A provides sample code for original class MountainBike 180. As with all java class definitions, original class MountainBike 180 includes a class declaration 510-1, and a class body 502. The class body 502 includes code, such as data members 504-1, constructors 506, and class methods 508. The constructors 506 include a default constructor 506-2, which is a constructor 506 with zero arguments in its signature, and non-default constructor 506-1.

FIG. 6B provides sample code for redefined class MountainBike 182. As with the original class MountainBike 180, the code for redefined class MountainBike 182 includes a class declaration 510-2 and a code body 502, the code body 502 including data members 504-2, class methods 508, and constructors 506.

However, the class declaration 510-2 of redefined class MountainBike 182 declares an inheritance relationship to new superclass Bike 184, the contents of which appear in FIG. 6C. Moreover, other information has changed in redefined class MountainBike 182. The number of data members 504-2 has changed, and the contents of the only non-default constructor 506-3 has changed to provide initialization for only those data members 504-2 that exist in the redefined class MountainBike 182.

FIG. 6C provides sample code for new superclass Bike 184. As with all java class definitions, new superclass Bike 184 includes a class declaration 510-3, and a class body 502. The class body 502 includes code, such as data members 504-3, one or more constructors 506, such as constructor 506-4, and class methods 508.

FIG. 6D provides a sample code snippet for a test program that references objects created from the classes of FIG. 6A-6C. A user, such as a software developer, compiles the code for FIG. 6A-6D along with other class files for the application 138 into bytecodes 192. The class loader 404 loads the bytecodes 192 associated with the classes into a Virtual Machine 150, such as a Java Virtual Machine, which executes the instructions for the application 138 on the computing device 100.

The code snippet of FIG. 6D illustrates problems that class redefinition of existing objects can create. An instance of the declaring class 512, "Bike," is created in 512-1. Then, the test program performs an operation on class method "addAttribute" for object "bike" of declaring class Bike 512-1. The execution of the code in 514 will cause null pointer exception errors.

The errors occur because any objects for original class "MountainBike" 180 in the application 138, that were constructed before the class redefinition by the user, have no knowledge of new superclass Bike 184. Specifically, the call to declaring class 512-1 to create an object instance of new superclass Bike 184 will not initialize the "attributes" Map object of data members 504-3. Only the non-default constructor 506-4 initializes the "attributes" Map object, allocating memory for the object and assigning initial values.

As a result, the call to declaring class 512-1 for new superclass Bike 184 will cause the Map "attributes" object of data members 504-3 to be uninitialized, and the java compiler will point this to a NULL object. When the call in 514 attempts to populate the "attributes" Map object, the application 138 will issue a null pointer exception.

As with the example for FIG. 5A, the sample code in 7E for the FIG. 5B example creates an instance of the declaring class 512-1, "Bike." Then, the test program performs an operation on class method "addAttribute" for object "bike" of declaring class Bike 512. Unlike the example for FIG. 5A, however, the execution of the code will not result in null pointer exception errors. This is because the FIG. 5B example utilizes the FIG. 3 transformer method and the FIG. 4 interceptor method to overcome the problems associated with current class redefinition approaches outlined herein.

FIG. 7A provides the sample code for redefined class MountainBike 182, which is identical to that of FIG. 6B, but is included to illustrate the creation of redefinition methods 186. FIG. 7E provides the identical code snippet of FIG. 6D, repeated for convenience.

FIG. 7E provides a sample code snippet for a test program that references objects created from the classes of FIG. 7A-7D. A user, such as a software developer, compiles the code for FIG. 7A-7D along with other class files for the application 138 into bytecodes 192. The transforming agent 160 works in conjunction with the class loader 404 to transform the bytecodes 192 for the classes, and load the transformed bytecodes 194 onto the virtual machine 150.

FIG. 7B shows the code for transformed class Mountain-Bike 182' which is the code for redefined class Mountain-Bike 182 after transformation by the transformer 162.

The application of the transformer method to the code in FIG. 7A, redefined class MountainBike 182, results in the code in FIG. 7B, transformed class MountainBike 182'. The transformed class MountainBike 182' includes the contents of redefined class MountainBike 182, and additionally includes generated redefinition methods 186-1 and 186-2.

The transformer 162 intercepts the class loader 404 in transformer method step 202, and selects the class file for redefined class MountainBike 182 in transformer method step 204. Then, in transformer method step 206, the transformer identifies a constructor within the class file, constructor 506-3. Because the transformer found a constructor within the class file in transformer method step 208, the transformer 162 transitions to transformer method step 212.

According to transformer method step 212, the transformer 162 creates an empty code body for redefinition method 186-1 from constructor 506-3, and transitions to transformer method step 214 to populate the contents of redefinition method 186-1.

For populating the contents of redefinition method 186-1, the transformer 162 in transformer method step 214 first determines that superclass "Bike" of "MountainBike" is not the top-level class in the class hierarchy for declaring class 512, "Bike." This is because the top-most class in the class hierarchy for declaring class 512 "Bike" is java.lang.Object. As a result, the transformer in step 218 inserts the code in FIG. 7B 804-1 that invokes superclass redefinition method 186-3 associated with the call to superclass 802 in constructor 506-3. Note that the redefinition method 186-3 itself is a member of the transformed new superclass 184 'Bike' in FIG. 7D.

Then, the transformer 162, according to transformer method step 222, inserts code for the conditional code statement in reference 806-1. Next, the transformer 162 inserts the remaining contents of the current constructor in reference 808-1 according to transformer method step 224. Finally, according to transformer method step 226, the transformer 162 completes the code for redefinition method 186-1 in reference 810.

Transformer method step 226 returns to step 206 to identify the next constructor in the current class file, 506-2. Because the transformer 162 found a constructor within the class file in transformer method step 208, the transformer 162 transitions to transformer method step 212.

In transformer method step 212, the transformer 162 creates an empty code body for redefinition method 186-2 from constructor 506-2, and transitions to transformer method step 214 to populate the contents of redefinition method 186-2.

For populating the contents of redefinition method 186-2, the transformer 162 in transformer method step 214 first determines that call 820 in the current constructor does not reference the top-level class in the class hierarchy, and transitions to transformer method step 218. According to transformer method step 218, the transformer 162 inserts the code in FIG. 7B 804-2 that invokes redefinition method 186-1 within the same class file, and transitions to transformer method step 222.

According to transformer method step 222, the transformer 162 determines that there are no remaining contents in constructor 506-2 beyond reference 820 to include within the conditional statement that transformer method step 222 normally generates. As a result, transformer method step 222 omits the insertion of what would otherwise have been an "empty" conditional statement. The transformer 162 transitions to transformer method step 226 to complete the code for redefinition method 186-2 in reference 810-2, and transitions to transformer method step 206 to identify the next constructor within the class file.

In transformer method step 206 and 208, the transformer 162 does not find any more constructors to process, proceeds to transformer method step 210 to save the contents of the class file, and transitions to transformer method step 204 to process the next class file.

FIG. 7C shows the code for new superclass Bike 184, with data members 504-3, class methods 508, and constructor 506-4 in code body 502.

The application of the transformer method to the code in FIG. 7C, new superclass Bike 184, results in the code in FIG. 7D, transformed new superclass Bike 184'. The transformed new superclass Bike 184' includes the contents of new superclass Bike 184, and additionally includes generated redefinition method 186-3.

Applying the transformer method to the new superclass Bike 184, the transformer 162 intercepts the class loader 404 according to transformer method step 202, and selects the class file for new class Bike 184 in transformer method step 204. Then, in transformer method step 206, the transformer identifies a constructor within the class file, constructor 506-4. Because the transformer found a constructor within the class file in transformer method step 208, the transformer 162 transitions to transformer method step 212.

In transformer method step 212, the transformer 162 creates an empty code body for redefinition method 186-3 from constructor 506-4, and transitions to transformer method step 214 to populate the contents of redefinition method 186-3.

For populating the contents of redefinition method 186-3, the transformer 162 in transformer method step 214 first determines that the superclass of the current constructor is java.lang.Object, which is the top-level class in the class hierarchy for declaring class 512, "Bike." As a result, the transformer 162 transitions to transformer method step 222.

According to transformer method step 222, the transformer 162 then inserts code for the conditional code statement in reference 806-2. Next, the transformer 162 inserts the remaining contents of the current constructor 506-4 in reference 808-2, according to transformer method step 224. Finally, according to transformer method step 226, the transformer 162 completes the code for redefinition method 186-3 in reference 810-3.

FIG. 7E, as in the code snippet of FIG. 6D, declares an instance of the declaring class, "Bike," in 512-1. At this point, the interceptor method for the interceptor 164, which operates at execution time, operates on the declaring class object Bike 512, and the objects that object Bike 512 references from FIG. 7A-7D.

Applying the interceptor method to the declaring class "Bike," in 512-1, results in the execution chain 850 in FIG. 7F, which initializes the "attributes" object of class Map within the data members 504-3 of transformed new superclass Bike 184'. As a result, subsequent calls that reference declaring class "Bike" 512-1, such as calls that set the attributes object in 514 of instance "bike" of declaring class "Bike" 512-1 will operate successfully upon existing MountainBike objects without encountering the null pointer exceptions encountered in the example in FIG. 5A.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for automatically invoking object initializers of superclasses added to the inheritance hierarchy of existing objects of an application running on a computing device, the method comprising:
    dynamically updating class definitions of the existing objects of the application running on the computing device;
    traversing an inheritance hierarchy of the existing objects to identify all superclasses added by the dynamic update of the application running on the computing device;
    identifying one or more object initializers for each of the superclasses of the application running on the computing device; and
    invoking the object initializers of the superclasses to initialize the code for each of the superclasses of the application running on the computing device.

2. The method of claim 1, wherein identifying one or more object initializers for each of the superclasses is accomplished during the creation of an object for each superclass, by analyzing the object initializers of the subclass of each created superclass object in the inheritance hierarchy of each created superclass object.

3. The method of claim 2, further comprising invoking the object initializers for each of the superclasses in the order specified by the inheritance hierarchy of each created superclass object.

4. The method of claim 2, further comprising creating code for class redefinition methods for each of the superclasses from the code of object initializers for each of the superclasses and from the code of the object initializers of the subclass of each created superclass object, and adding the class redefinition methods to the classes for each of the superclasses.

5. The method of claim 4, wherein the adding of the class redefinition methods to the classes for each of the superclasses results in transformed superclasses.

6. The method of claim 5, further comprising invoking the class redefinition methods for each of the transformed superclasses to initialize the code for each of the transformed superclasses.

7. The method of claim 1, wherein the dynamic updating of the class definitions of the existing objects accepts redefined classes for the existing objects.

8. The method of claim 7, further comprising creating code for class redefinition methods from the code of object initializers for each of the superclasses and from the code of the object initializers of the subclass of each created superclass object, and adding the class redefinition methods to the redefined classes for the existing objects.

9. The method of claim 8, wherein the adding of the class redefinition methods to the redefined classes for the existing objects results in transformed redefined methods for the existing objects.

10. The method of claim 9, further comprising invoking the class redefinition methods for each of the transformed redefined classes for the existing objects to initialize the code for each of the transformed redefined classes.

11. The method of claim 1, further including identifying object initializers for each of the new superclasses that include zero arguments.

12. The method of claim 1, further including identifying object initializers for each of the new superclasses using information supplied in an application.

13. The method of claim 1, further including performing the method via software running within, or as an extension of, a virtual machine.

14. The method of claim 1, further including performing the method by transforming bytecode of one or more of the superclasses, the transforming of the bytecode enabling the invoking of the object initializers of the superclasses to initialize the code for each of the superclasses.

15. The method of claim 1, wherein dynamically updating class definitions of the existing objects, traversing the inheritance hierarchy, identifying the one or more object initializers for each of the superclasses, and invoking the object initializers of the superclasses to initialize the code for each of the superclasses are performed without restarting the application running on the computing device.

16. A system for automatically invoking object initializers of superclasses added to the inheritance hierarchy of existing objects of an application running on a computing device, comprising:
  a class loader executing on the computing device for loading dynamically updated class definitions of the existing objects;
  a class file transformer that traverses an inheritance hierarchy of the existing objects to identify all superclasses added by the dynamic update, and identifies one or more object initializers for each of the superclasses; and
  a declaring class interceptor that invokes the object initializers of the superclasses identified by the class file transformer to initialize the code for each of the superclasses.

17. The system of claim 16, wherein the declaring class interceptor identifies one or more object initializers for each of the superclasses by analyzing the object initializers of the subclass of each created superclass object in the inheritance hierarchy of each created superclass object, during the creation of an object for each superclass.

18. The system of claim 17, wherein the declaring class interceptor invokes the object initializers for each of the superclasses in an order specified by the inheritance hierarchy of each created superclass object.

19. The system of claim 17, wherein the class file transformer creates code for class redefinition methods for each of the superclasses from the code of object initializers for each of the superclasses and from the code of the object initializers of the subclass of each created superclass object, and adds the class redefinition methods to the classes for each of the superclasses.

20. The system of claim 19, wherein the adding of the class redefinition methods to the classes for each of the superclasses by the class file transformer results in transformed superclasses.

21. The system of claim 20, wherein the declaring class interceptor invokes the class redefinition methods for each of the transformed superclasses to initialize the code for each of the transformed superclasses.

22. The system of claim 16, wherein the class loader accepts redefined classes for the existing objects during the dynamic updating of the class definitions of the existing objects.

23. The system of claim 22, wherein the class file transformer creates code for class redefinition methods from the code of object initializers for each of the superclasses and from the code of the object initializers of the subclass of each created superclass object, and adds the class redefinition methods to the redefined classes for the existing objects.

24. The system of claim 23, wherein the adding of the class redefinition methods to the redefined classes for the existing objects by the class file transformer results in transformed redefined methods for the existing objects.

25. The system of claim 24, wherein the declaring class interceptor invokes the class redefinition methods for each of the transformed redefined classes for the existing objects to initialize the code for each of the transformed redefined classes.

26. The system of claim 16, wherein the declaring class interceptor identifies object initializers for each of the new superclasses that include zero arguments.

27. The system of claim 16, wherein the declaring class interceptor identifies object initializers for each of the new superclasses using information supplied in an application.

28. The system of claim 16, further comprising a virtual machine that accepts bytecode of one or more of the superclasses.

29. The system of claim 28, wherein the virtual machine transforms the bytecode of one or more of the superclasses, which enables the invoking of the object initializers of the superclasses to initialize the code for each of the superclasses.

30. The system of claim 16, wherein the class loader loads dynamically updated class definitions of the existing objects, the class file transformer traverses an inheritance hierarchy of the existing objects to identify all superclasses added by the dynamic update, and identifies one or more object initializers for each of the superclasses, and the declaring class interceptor invokes the object initializers of the superclasses identified by the class file transformer to initialize the code for each of the superclasses without restarting the application running on the computing device.

* * * * *